US 7,844,760 B2

(12) United States Patent
Jeyaseelan et al.

(10) Patent No.: US 7,844,760 B2
(45) Date of Patent: Nov. 30, 2010

(54) SCHEDULE AND DATA CACHING FOR WIRELESS TRANSMISSION

(75) Inventors: Jaya L. Jeyaseelan, Cupertino, CA (US); Indudharswamy Hiremath, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 297 days.

(21) Appl. No.: 11/904,933

(22) Filed: Sep. 29, 2007

(65) Prior Publication Data
US 2009/0089459 A1 Apr. 2, 2009

(51) Int. Cl.
G06F 3/00 (2006.01)
H04Q 11/00 (2006.01)

(52) U.S. Cl. ........................................ 710/52; 370/412
(58) Field of Classification Search ............... 710/52; 370/412
See application file for complete search history.

(56) References Cited

U.S. PATENT DOCUMENTS

2004/0015504 A1* 1/2004 Ahad et al. .................. 707/100
2005/0286544 A1* 12/2005 Kitchin et al. ............... 370/412

OTHER PUBLICATIONS

Enhanced Host Controller Interface Specification for Universal Serial Bus, Revision 1.0, Intel Corporation, Mar. 12, 2002.
Wireless Host Controller Interface Specification for Certified Wireless Universal Serial Bus, Revision 0.95, Intel Corporation, Jun. 16, 2006.
SIPO People's Republic of China, Office Action for Chinese Patent Application No. 200810177871.5 mailed Feb. 12, 2010.

* cited by examiner

Primary Examiner—Henry W. Tsai
Assistant Examiner—Hyun Nam
(74) Attorney, Agent, or Firm—Blakely, Sokoloff, Taylor & Zafman LLP

(57) ABSTRACT

A method and apparatus for schedule and data caching for wireless transmissions. An embodiment of a method may include generating a schedule of queues for a wireless controller, the schedule being generated at a driver on a host system. In some embodiments schedule data may be cached at the wireless controller from the host system, where the cache may include active queues and page list entries for the active queues. The wireless controller may be operated using the cached queues.

20 Claims, 6 Drawing Sheets

SCHEDULE AND DATA CACHING FOR WIRELESS TRANSMISSION

FIELD

Some embodiments of the invention generally relate to data operations. In particular, some embodiments relate to schedule and data caching for wireless transmission.

BACKGROUND

Computing system and other electronic systems have commonly transported data over wired buses between the many components. Many different protocols have been used for such data transmissions, including variations of the universal serial bus (USB) (USB 1, USB 2.0, and any following standards) and other bus standards. Many different devices may be connected in such operation, requiring numerous wired connections.

Systems are transitioning to increasing numbers of wireless operations, including Wireless USB (Certified Wireless USB of the USB-IF—USB Implementers Forum, Inc.) The use of wireless operations such as Wireless USB allows the connection of multiple devices without requiring many wired connections. Instead, the transmission of the data elements from the multiple devices in a system is handled wirelessly However, the use of Wireless USB or similar systems requires that the data be scheduled for transmission for the multiple connected devices, and that such scheduling be provided to a wireless controller. The transfer of such ordering from a host system driver to the wireless controller can cause a significant amount of transactions, distributed in time across the bus connecting the wireless controller and the host system containing the host controller driver. This seldom allows the host platform to go into low power states.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
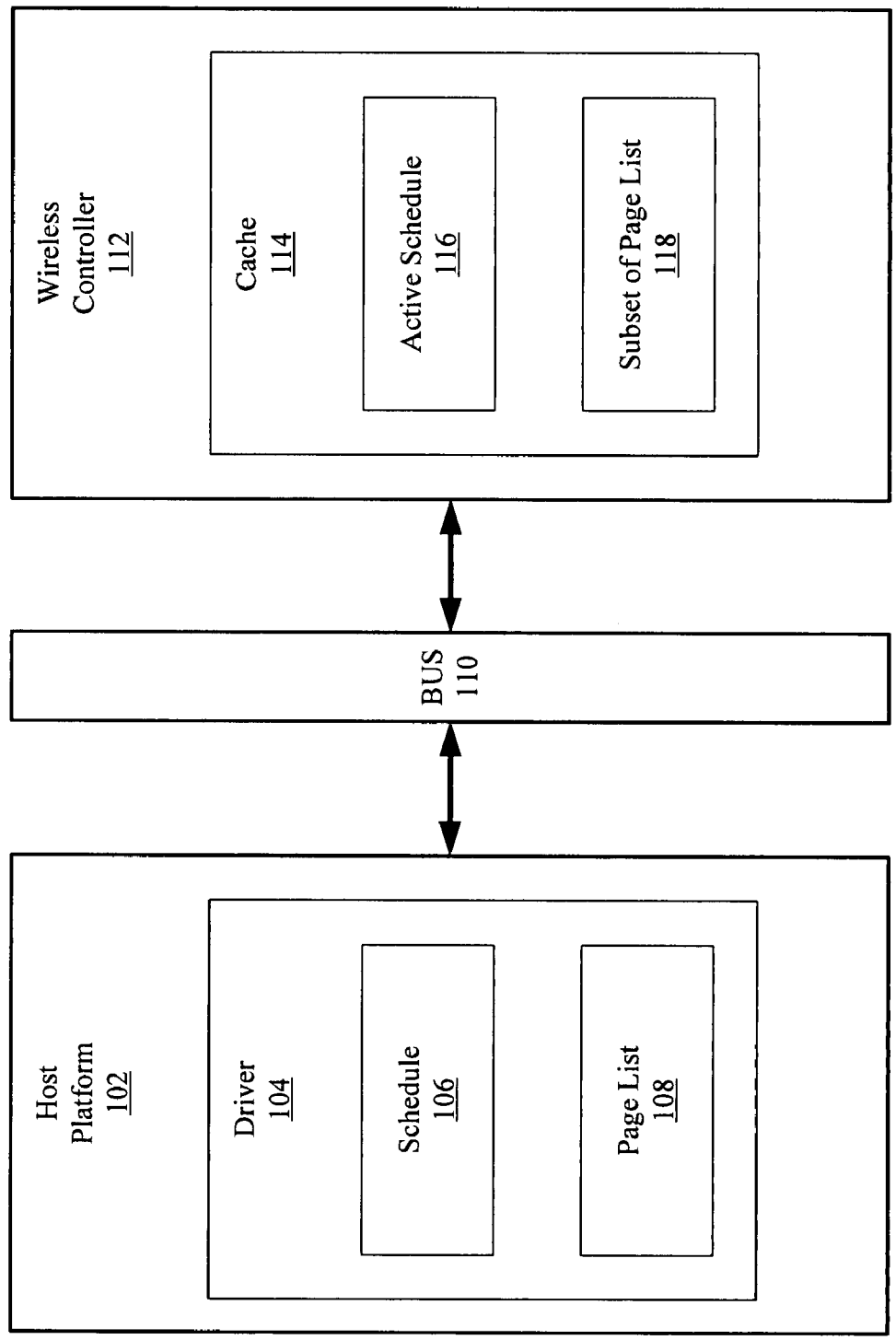
FIG. 1 illustrates an embodiment of a system for caching wireless schedules and data.

An embodiment of the invention concerns schedule and data caching for wireless transmission.

In some embodiments, a process is provided to improve efficiency of wireless transmission. In some embodiments, asynchronous schedule and control/bulk data caching is provided for a wireless controller. In an embodiment, the wireless controller is a USB wireless host controller (WHC) implementation.

In some embodiments, a WHC module may be implemented on an add-on card or similar component that interfaces with the platform via a bus, or may alternatively be embedded in the platform. A bus may include a PCI (Peripheral Component Interconnect) or PCIe (PCI Express) standard bus. This description will focus on an implementation in which the WHC module exists on an add-on card, but embodiments of the invention are not limited to this implementation. In some embodiments, logic for implementing caching exists on the WHC module. In Wireless USB, the Wireless Host Controller Interface Specification for Certified Wireless Universal Serial Bus (including Revision 0.95 issued Jun. 16, 2006 and any subsequent revisions) describes the interface between system software and a UWB (Ultra-Wideband) Multi-Interface Controller for a wireless universal serial bus (Wireless USB) host system.

In Wireless USB operation, a QSet (or queue set) is used to describe wireless transactions to or from an endpoint. The WHC uses one or more QSets to create a transaction group. A QSet consists of a QHead and one or more qTD (Queue Element Transfer Descriptor) structures. The QHead contains numerous defined elements, including a pointer to the next QHead (WusbAsyncListAddr). In general, the processing model for the WHC's use of QSets is:

(1) Read one or more QSets and create a transaction group based on the transfer descriptors of the QSets.

(2) Execute the transaction group, moving data into or out of the system as required.

(3) Write the results of the transactions to an overlay area of the individual heads.

(4) Repeat (1)-(3) until an end condition is reached.

The WHC utilizes two types of schedules, these schedules being a periodic schedule and an asynchronous schedule. The asynchronous schedule is based on an asynchronous transfer list. The asynchronous transfer list is used to manage all control and bulk transfers are managed. The asynchronous transfer list is a circular list of QHeads, with the WusbAsyncListAddr being the pointer to the next QHead. The asynchronous transfer list implements a round-robin service for all QHeads linked into the asynchronous list.

In some embodiments, a WHCI (wireless host interface) driver in the host prepares an asynchronous schedule in host memory, and then enables the schedule. In some embodiments, the WHC maintains a cache of the active QSets. In some embodiments, together with the active QSets, the WHC also caches a subset of the page list entries. In addition, the WHC saves the current page index and current page pointer for each QSet, such that the next following data transfer can be initiated from the correct point when the endpoint associated with the QSet gets an opportunity again in the schedule. For asynchronous data, the controller has one transmit queue and one receive queue.

In some embodiments, the cache is updated to reflect changes in the asynchronous schedule. In some embodiments, whenever a schedule is updated by the WHCI driver to add or remove QSets, or whenever an inactive QSet becomes active or an active QSet becomes inactive, the WHC is informed via a command. Upon receiving the updates, the WHC will update its internal cache to reflect the changes.

When multiple QSets are active, in order to give round robin fairness to all the endpoints, the WHC will only fetch data whose maximum length is equal to the maximum endpoint size times maximum burst size for a specific QSet. Then it will move to the next QSet. Based on the RF link quality and device response, the WHC can dynamically vary burst size up to a max burst size for any endpoint.

In operation of a wireless host controller, accesses to host memory for data are consolidated. For transmit operation, after calculating how much data can be transmitted per endpoint, the WHC will fetch as much data from host memory as can be fit in the WHC TX (transmit) data buffers. If there is room for data from different QSets they will all be fetched. For the controller, there is a threshold associated with each data queue. For TX, only after sufficient data has been transferred over the air and the data in the TX queue has fallen below the threshold is data again fetched from host memory. This will allow for the host platform to go to low power states in between data transfers.

For receive operation, the transaction scheduler will schedule transactions to poll the device for IN (IN describing the data direction) transactions. Once data is received, such data will be placed in the RX (receive) queue. If there is sufficient buffering provided, as an optimization, the WHC can hold data until the RX Queue threshold is reached or a timeout is reached, and then write to host memory. When the data pattern is short and intermittent, then the write to host memory may be done on a timeout timed from arrival of data. This will allow for the host platform to go to low power states in between data transfers.

When possible, the WHC should synchronize accesses to the host platform for transmit and receive operations.

In some embodiments, the active asynchronous schedule and the relevant page list entries are cached in the WHC local memory. For this reason, host memory is generally only required to be accessed when there is data to be transmitted or received. For example, for Bulk IN transactions over the air, once the schedule is cached, host memory is not accessed unless there is data returned by the wireless device when the wireless device is polled. Because of this, the platform to go into low power states, thereby reducing overall power consumption through use of the data cache.

Even during accesses to the host memory in active data transfers, by consolidating accesses, platform power consumption can be reduced. Minimum data that is required to be cached in the WHC is dependant on the latency to fetch the data from host memory. However, by increasing this data buffer memory in WHC, sufficient data may be buffered in WHC so that the host platform memory is not accessed frequently.

In some embodiments, data transfer is improved through use of data caching. By caching the active asynchronous schedule along with the relevant page list entries, when data is to be fetched from or written to host memory due to opportunity to transmit over the air or when data is received, the WHC does not need to access host platform memory to fetch the schedule or page lists. This allows optimal use of air time, and hence improved data throughput.

In some embodiment, an algorithm caches only those QSets that are active, thereby reducing data transfer and storage. The WHCD host driver may not promptly remove inactive QSets from the schedule. By caching only the active QSets, the WHC cache memory requirements and utilization casts are reduced. In order for the WHC to schedule transactions over the air optimally by placing many transactions within a transaction group, it is beneficial for the WHC to be aware of as many schedules as possible. By limiting caching of QSets to active QSets, the process maximizes the useful information available to the WHC.

FIG. 1 illustrates an embodiment of a system for caching wireless schedules and data. In this illustration, a host platform 102 includes a wireless controller driver 104. The driver 104 generates a schedule for wireless transactions 106, together with table entries 108 for transactions. The host platform 102 may be coupled to a wireless controller 112, such as a wireless USB controller via a bus 110. The wireless controller 112 operates according to the schedule of wireless transactions. However, in order to increase efficiency in operation, the wireless controller 112 generates a cache 114 of the schedule, the cache 114 including only the active transaction elements 116 and a subset of entries of the page list 118 including relevant page list entries describing active transactions.

Figure 2:
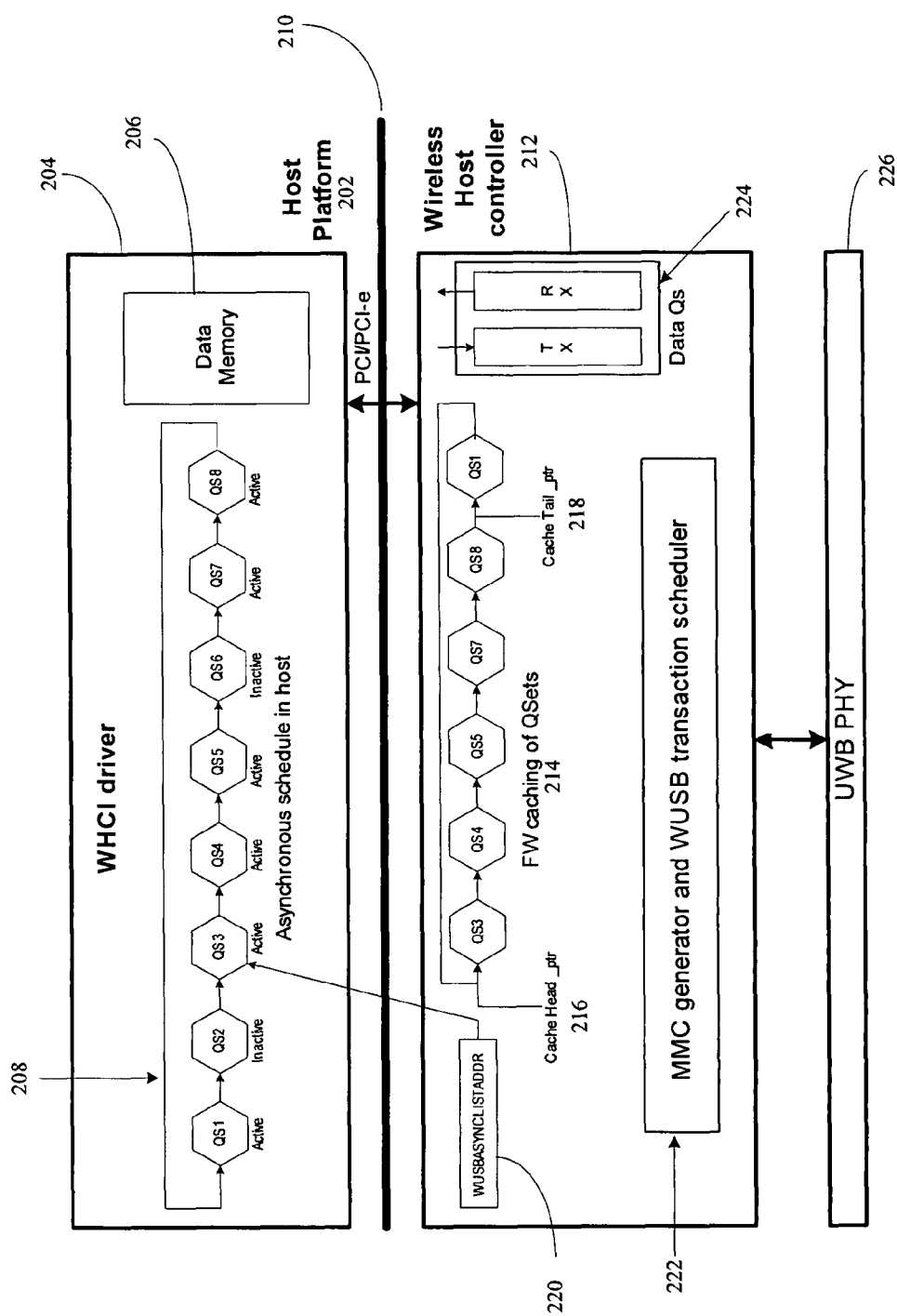
FIG. 2 is an illustration of an embodiment of a system for caching of schedules and data for wireless transmissions.

FIG. 2 is an illustration of an embodiment of a system for caching of schedules and data for wireless transmission. In this illustration, a WHCI driver 204 is included on a host platform 202. The driver 204 includes a data memory, which may be stored in memory elements of the host platform 202. Memory may includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The data memory 206 may include page entries for QSets to be scheduled. The driver 204 generates an asynchronous schedule of QSets. In this illustration, eight QSets, QS1 through QS8, are scheduled in the transaction group. However, only six of the QSets are currently active in operation, with QSets QS2 and QS6 being inactive. The host platform 202 is coupled via a bus 210, which may include, but is not limited to, a PCI or PCIe standard bus, to a wireless host controller 212, which is coupled to the UWB radio PHY (physical layer device). The wireless host controller 212 includes a cache of QSets 214, with such cache being limited to active QSets. The cached sets are joined in a transaction group, including a cache header pointer 216 to designate the beginning of the group and a cache tail pointer 218 to designate an end of the group. As indicated, WusbAsyncListAddr 220 contains the pointers for each QSet to next QSet. The wireless host controller 212 further includes an MMC (Micro-scheduled Management Command) generator and WUSB transaction scheduler, whose function includes the scheduling of the cached QSets. The wireless host controller further includes the data queues 224 for transmit data (TX) and receive data (RX).

Figure 3:
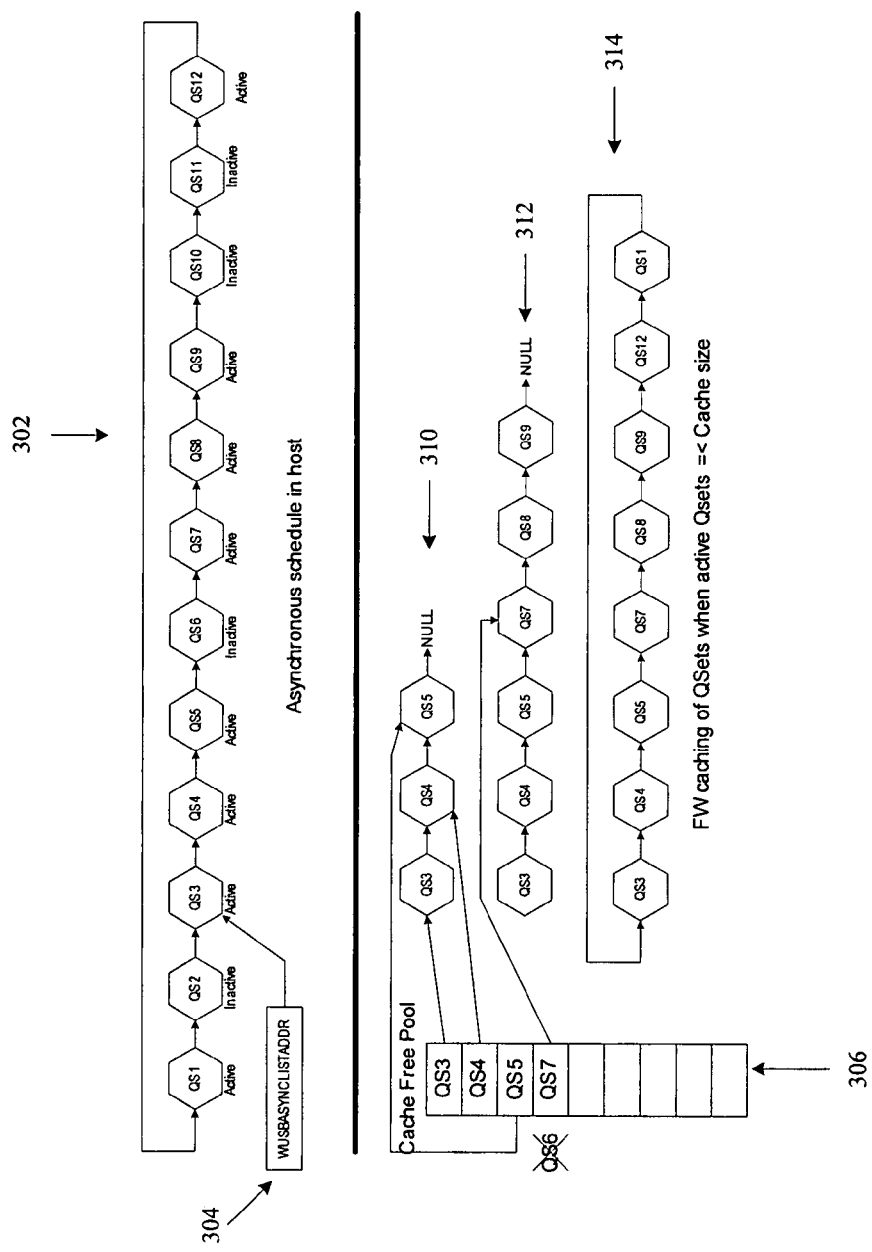
FIG. 3 is an illustration of a process for caching of schedules and data for wireless transmission

FIG. 3 is an illustration of a process for caching of schedules and data for wireless transmission. In an example, when the cache size is 8, FIG. 3 illustrates how the schedule is cached in the WHC. In this example, an asynchronous schedule in the host 302 includes 12 elements, QS1-QS12, with eight active elements. However, the active QSets in this example are equal to the size of the cache, and could be greater. A cache free pool 306 illustrates the building of the cache, initially including QS3, QS4 and QS5 310. The cache then adds QS7, with QS6 being inactive, followed by QS8 and QS9 312. The cache then is completed with QS12 and QS1. Once all the active elements have been cached, the loop is closed. From this point onwards, if several (to be tuned) active transfer descriptors (TDs) per QSet have been completed, then the TDs in host memory are updated and new TDs are fetched. In some embodiments, there is a separate notification from the driver if QSets are added or deleted for the schedule, or if an inactive QSet goes active. In this circumstance, the entire cache is flushed and then rebuilt.

Figure 4:
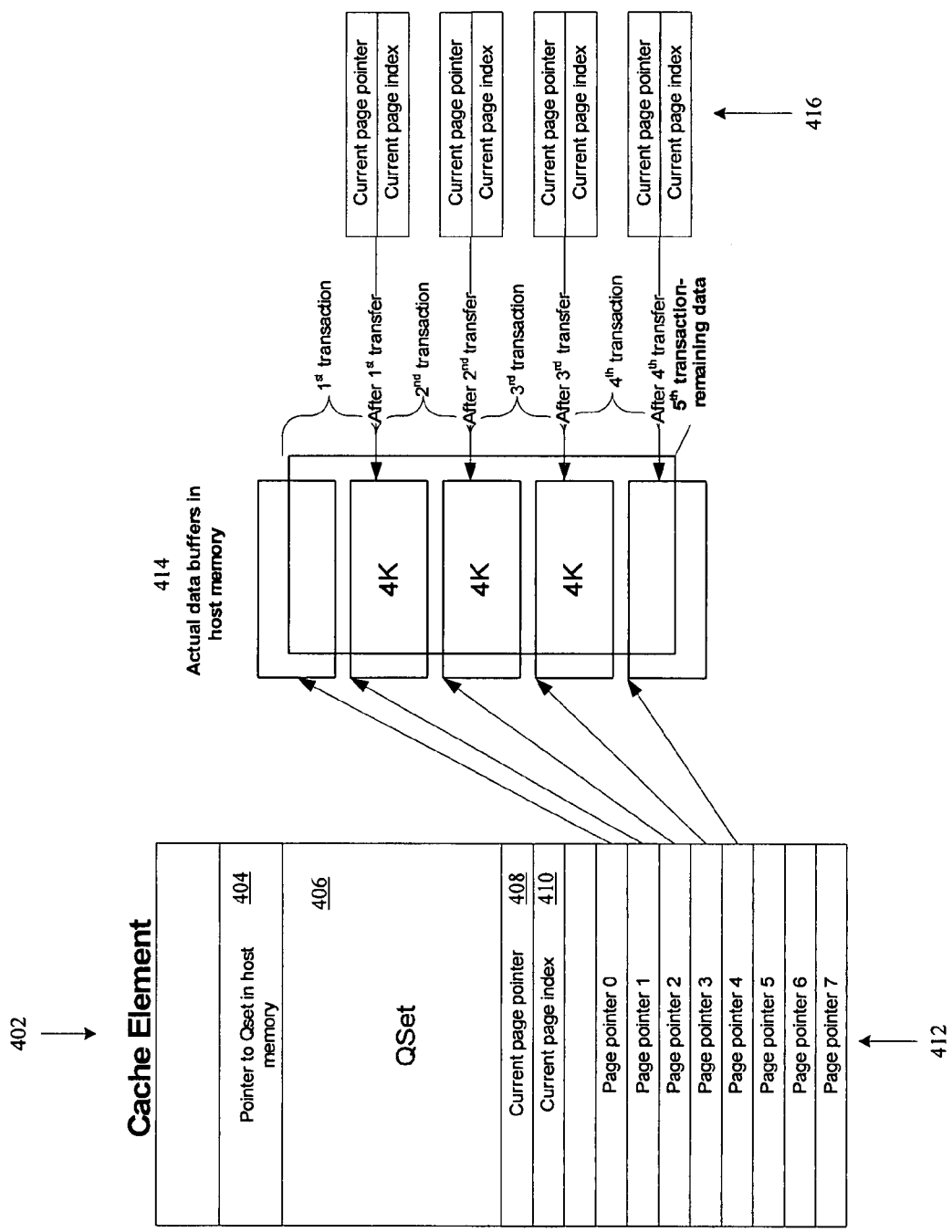
FIG. 4 illustrates an embodiment of a format of a wireless host controller cache element.

An embodiment of a format of a WHC cache element 402 is illustrated in FIG. 4. The pointer to the QSet in host memory 404 enables accessing the QSet 406 in host memory. The entire QSet is cached. In the example provided in FIG. 4, 8 entries are cached in the page list 412. The current page pointer 408 and current page index point 410 to the data for the next transfer for a transfer descriptor. If a cache is to be flushed, the current page pointer 408 and current page index 410 are stored in the HC scratch pad memory in host memory. As illustrated, the page pointers point to data buffers in host memory 414, with each entry having a current page pointer and current page index after each transaction.

By caching the asynchronous schedule along with the relevant page list entries, data can be fetched from or written to host memory without having to fetch the transfer descriptor and page list entries for every data transaction. This improves air utilization and hence improves data throughput.

In some embodiments, platform power consumption may be decreased by consolidating accesses to host memory. By schedule caching, platform memory is only accessed when there is data to be fetched or written or when schedule cache is to be updated. In addition, by increasing data buffering in the WHC, even though there is added cost due to this, the reads and writes from and to host memory are consolidated, thus allowing the platform to stay in low power states for a longer duration.

Figure 5:
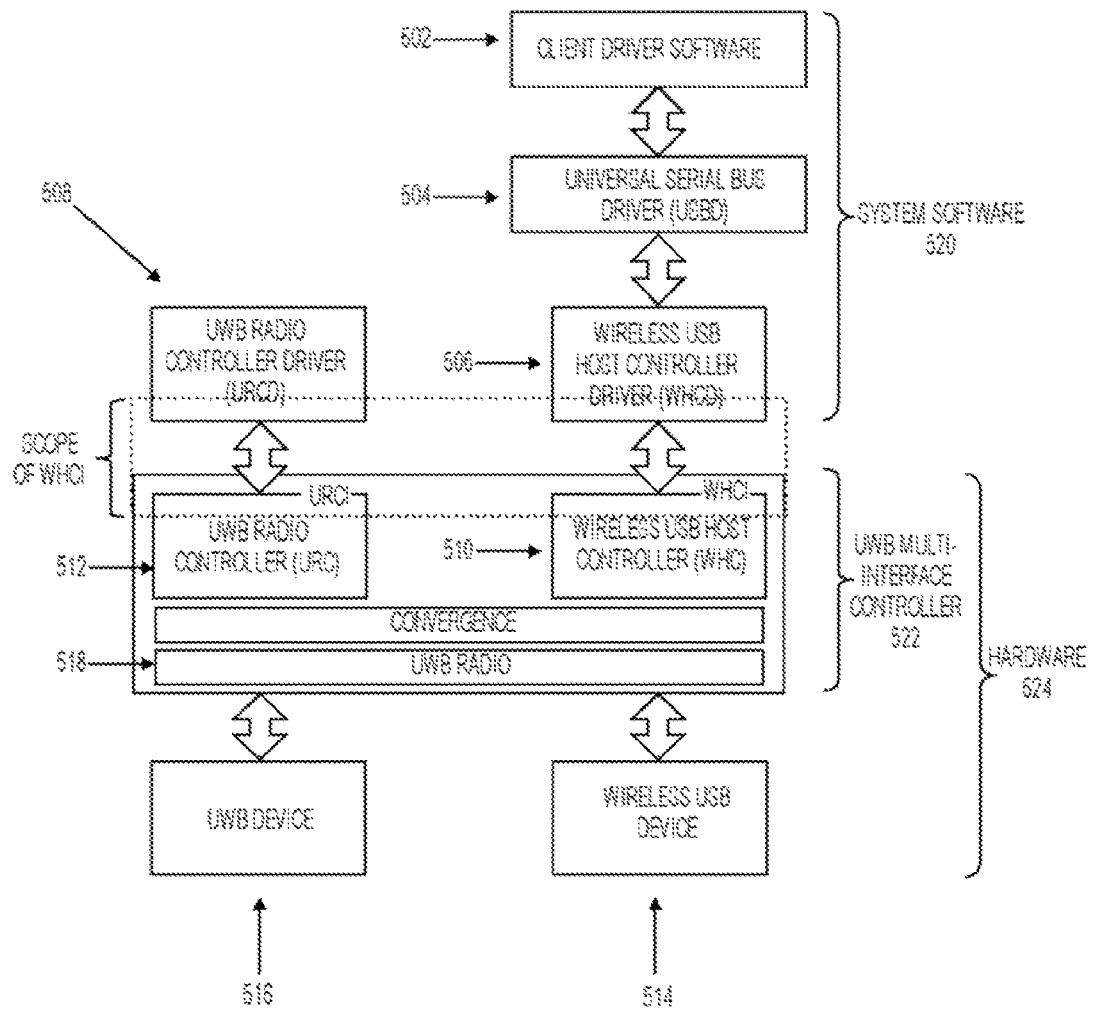
FIG. 5 is an illustration of wireless universal serial bus components and modules in which an embodiment of the invention may be implemented.

FIG. 5 is an illustration of wireless universal serial bus components and modules in which an embodiment of the invention may be implemented. The elements include system software 520 and hardware 524, including the UWB multi-interface controller 522. As illustrated, the wireless USB bus components and modules may include:

Client Driver Software 502—The client driver software 502 executes on the host PC corresponding to a particular Wireless USB device. Client software is typically part of the operating system or provided with the Wireless USB device.

USB Driver (USBD) 504—The USBD is a system software component that abstracts the details of the particular host controller driver for a particular operating system.

Wireless USB Host Controller Driver (WHCD) 506—The WHCD 506 provides the software layer between a specific Host Controller hardware and the USBD.

UWB Radio Controller Driver (URCD) 508—The URCD 508 is a system software component that provides control functions of the UWB Radio, and is required in each implementation of a UMC.

Wireless USB Host Controller (WHC) 510—The WHC is the specific hardware implementation of the Wireless USB host controller.

UWB Radio Controller (URC) 512—The URC 512 is the standard UWB radio control function required in each implementation of a UMC.

Wireless USB Device 514—This is a hardware device that performs a useful end-user function. Interactions with Wireless USB devices flow from the applications through the software and hardware layers to the Wireless USB devices.

UWB Device 516—This is another external hardware device with a UWB radio interface. This device may have one or more PAL (protocol application layer) functions, e.g. WiNET (WiMedia Networking Protocol) processes.

UWB radio 518—Illustrating the physical radio device for wireless operation.

Figure 6:
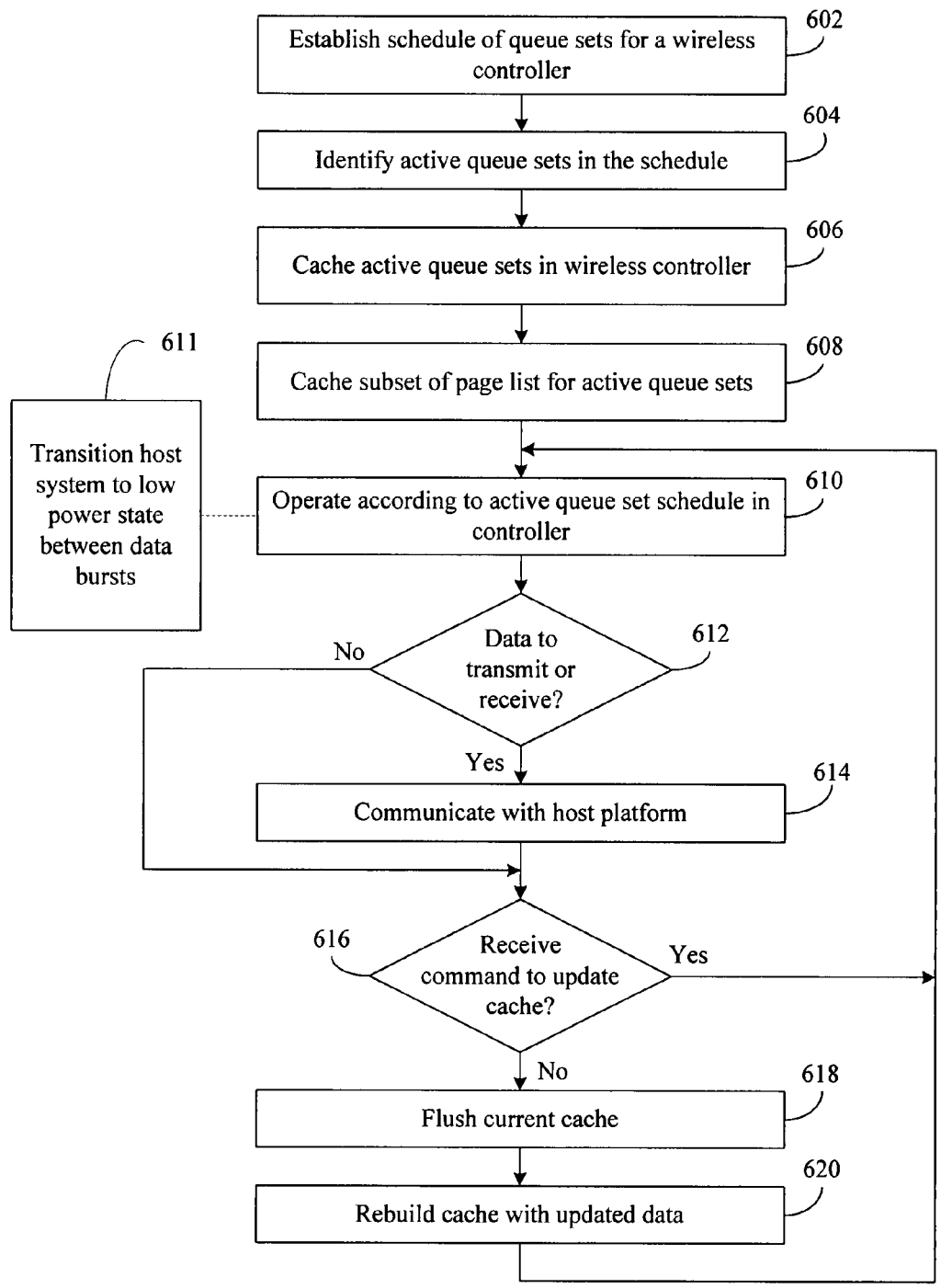
FIG. 6 is a flowchart to illustrate an embodiment of a process for caching data for a wireless controller.

FIG. 6 is a flowchart to illustrate an embodiment of a process for caching data for a wireless controller. In this illustration, a schedule of queue sets for a wireless controller is established in a host system 602. The active queue sets in the schedule are identified 606. Only the active queue sets are cached in a wireless controller 606, together with as subset of the page list entries 608.

The wireless controller then operates according to the active queue set schedule cached in the controller 610, without need for accessing the host system. The host system may transition to a lower power state at times between transmit and receive data transfers 611 because there is no need to access the host system for queue set scheduling. If there is data to transmit or receive 612, then there is an access to the host platform 614. Upon receiving a command to update the cache 616, the wireless controller will take action to update, which may include flushing the current cache 618 and rebuilding the cache with the updated data.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but processes can be added to or deleted from any of the methods and information can be added or subtracted from any of the described messages without departing from the basic scope of the present invention. It will be apparent to those skilled in the art that further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A method comprising:
generating an asynchronous schedule of queues of wireless transactions for a wireless host controller and a table of page entries for the wireless transactions, the schedule being generated by a driver on a host platform and stored in memory on the host platform;
identifying active queues in the asynchronous schedule of queues;

caching schedule data at the wireless host controller from the host platform in a cache located in a local memory of the wireless host controller, wherein entries in the cache include:

the active queues of the schedule of queues, the active queues being stored as a loop of queues in the cache, and a subset of the table of entries containing page list entries for the active queues;

operating the wireless host controller based on the queues in the cache, wherein operating the wireless host controller includes fetching data from the host platform to the wireless host controller or writing data to the host platform from the wireless host controller based on entries contained in the cache; and updating the cache to reflect changes in the asynchronous schedule of queues of the host platform.

2. The method of claim 1, wherein the wireless host controller is a wireless USB (Universal Serial Bus) controller.

3. The method of claim 1, wherein each queue of the schedule of queues comprises a queue set (QSet) for a transaction.

4. The method of claim 1, wherein updating the cache includes receiving a notification of a change in the active queues of the asynchronous schedule of queues, and rebuilding the cache based on the change in the active queues.

5. The method of claim 4, wherein the change in the active queues of the asynchronous schedule of queues includes one or more of adding a scheduled queue, deleting a scheduled queue, changing an inactive queue to active, or changing an active queue to inactive.

6. The method of claim 1, further comprising transitioning the host platform to a low power state while the wireless host controller operates based on the queues in the cache.

7. A wireless host controller comprising:

a memory to hold a cache, the cache to hold active queues and page list entries for the active queues, the active queues and page list entries being cached from an asynchronous schedule of queues and a table of page entries stored on a host platform, the wireless host controller to generate a transaction group of the active queues in the cache based on transfer descriptors in the active queues; and data queues for transmission and reception of data according to the active queues in the cache;

wherein the wireless host controller is to generate wireless transactions according to the transfer descriptors of the active queues, including the wireless host controller fetching data from the host platform or writing data to the host platform based on entries contained in the cache, and to update the cache to reflect changes in the asynchronous schedule of queues of the host platform.

8. The wireless host controller of claim 7, wherein the wireless host controller is a wireless USB (Universal Serial Bus) controller.

9. The wireless host controller of claim 8, wherein each queue of the asynchronous schedule of queues comprises a queue set (QSet) for a transaction.

10. The wireless host controller of claim 7, wherein updating the cache includes the wireless host controller updating the cache based on notifications received from the host platform regarding active queues of the asynchronous schedule of queues.

11. The wireless host controller of claim 10, wherein updating the cache include the wireless host controller rebuilding the cache upon receiving notice from the host platform regarding a change in the active queues of the asynchronous schedule of queues.

12. The wireless host controller of claim 7, wherein the wireless host controller is to consolidate accesses to host memory.

13. The wireless host controller of claim 12, further comprising one or more transmit buffers, and wherein for transmit operation the wireless host controller is operable to consolidate accessed to memory by fetching as much data from the host platform as can be fit in the one or more transmit data buffers for the wireless host controller, wherein the wireless host controller is to fetch the data from the host platform without fetching transfer descriptors or page list entries.

14. The wireless host controller of claim 12, wherein for receive operation the wireless host controller is operable to hold data until a receive queue threshold or a timeout is reached and then write the data to host memory.

15. A system comprising:

a bus;

a host platform coupled to the bus, the host platform including SDRAM memory to hold a wireless controller driver, the wireless controller driver to generate an asynchronous schedule of queues of wireless transactions and a table of page entries for the wireless transactions stored in memory of the host platform; and a USB (Universal Serial Bus) wireless host controller coupled to the bus, the USB wireless host controller including a cache in a memory on the USB wireless host controller, the cache to cache active queues from the asynchronous schedule of queues and page entries for the active queues, wherein the USB wireless host controller is to generate a transaction group based on transfer descriptors in the active queues in the cache.

16. The system of claim 15, wherein the host platform is to provide a notification to the USB wireless host controller regarding a change in the active queues in the asynchronous schedule of queues.

17. The system of claim 16, wherein the USB wireless host controller is to flush the cache and rebuild the cached schedule based on the notification received from the host platform.

18. The system of claim 15, wherein the host platform is to transition to a low power state during operation of the USB wireless host controller between data transmit and data receive transfers.

19. The method of claim 1, wherein the fetching of data from the host platform to the wireless host controller or the writing of data to the host system from the wireless host controller based on the entries in the cache including fetching or writing without fetching transfer descriptors or page list entries from the host platform.

20. The wireless host controller of claim 7, wherein the wireless host controller is operable to fetch data from the host platform or write the data to the host platform based on the cache without fetching transfer descriptors or page list entries from the host platform.

* * * * *